United States Patent
Hery et al.

(10) Patent No.: US 10,438,403 B1
(45) Date of Patent: Oct. 8, 2019

(54) RENDERING AN IMAGE BASED ON BI-DIRECTIONAL PHOTONS

(71) Applicant: Pixar, Emeryville, CA (US)

(72) Inventors: Christophe Hery, San Rafael, CA (US); Ryusuke Villemin, San Francisco, CA (US)

(73) Assignee: Pixar, Emeryville, CA (US)

( * ) Notice: Subject to any disclaimer, the term of this patent is extended or adjusted under 35 U.S.C. 154(b) by 81 days.

(21) Appl. No.: 15/389,882

(22) Filed: Dec. 23, 2016

(51) Int. Cl.
*G06T 15/50* (2011.01)
*G06T 15/06* (2011.01)
*G06T 7/11* (2017.01)
*G06T 7/70* (2017.01)

(52) U.S. Cl.
CPC ............ *G06T 15/50* (2013.01); *G06T 7/11* (2017.01); *G06T 7/70* (2017.01); *G06T 15/06* (2013.01)

(58) Field of Classification Search
None
See application file for complete search history.

(56) References Cited

U.S. PATENT DOCUMENTS

2005/0275652 A1* 12/2005 Keller .................. G06F 17/18
345/419

OTHER PUBLICATIONS

Henrik Wann Jensen; "Global Illumination using Photon Maps;" 1996, Proceedings of the 7th Eurographics Workshop on Rendering; p. 21039.*
Vorba, J. and Krivanek, J. 2011. Bidirectional photon mapping. In proceedings of CESCG 2011, the 15th CEntral European Seminar on Computer graphics.*

* cited by examiner

*Primary Examiner* — Peter Hoang
(74) *Attorney, Agent, or Firm* — Patterson + Sheridan, LLP (57) ABSTRACT

The present disclosure relates to a method, computer program product, and system for rendering one or more objects in a set. The illumination agent designates a region of interest in the set to be rendered. The illumination agent defines an amount of photons to be directed towards the region of interest in the set. The illumination agent generates a photon map of the set. The illumination agent generates a portion of the photon map based on the region of interest and the designated amount of photons to be applied to the region of interest. The illumination agent generates a remainder of the photon map based on an area exterior to the region of interest and a second amount of photons to be applied to the area. The processor transmits the photon map for processing.

20 Claims, 8 Drawing Sheets

RENDERING AN IMAGE BASED ON BI-DIRECTIONAL PHOTONS

BACKGROUND

Field of the Invention

The present disclosure relates to the field of computer animation and, in particular, to an improved illumination method for rendering a three-dimensional scene.

Description of the Related Art

Production of animated films often include complex geometric detail which gives rise to very long render times for each rendered image frame. During a typical render, a small portion of a three-dimensional (3D) scene file description is visible in the final rendered image, as defined by the position and direction of a virtual camera that is directed at the 3D scene file. The scene file includes the set of graphics object and light sources included in a 3D space.

One of the most accurate and straightforward approaches to determining global illumination (including direct and non-direct illumination) for rendering sets is computer graphics with ray tracing. Because of computing constraints, however, only a set number of photons can be used when generating an image from a 3D scene. Generally, photons are applied in the rendering process uniformly from the light sources in a 3D scene when gathering an image. However, in doing so, certain regions of interest may not have a suitable level of detail.

SUMMARY

The present disclosure relates to a method, computer program product, and system for rendering an object in a set. The illumination agent designates a region of interest in the set to be rendered. The illumination agent defines an amount of photons to be directed towards the region of interest in the set. The illumination agent generates a photon map of the set. The illumination agent generates a portion of the photon map based on the region of interest and the designated amount of photons to be applied to the region of interest. The illumination agent generates a remainder of the photon map based on an area exterior to the region of interest and a second amount of photons to be applied to the area. The illumination agent transmits the photon map for processing.

BRIEF DESCRIPTION OF THE DRAWINGS

So that the manner in which the above recited aspects are attained and can be understood in detail, a more particular description of embodiments of the invention, briefly summarized above, may be had by reference to the appended drawings.

It is to be noted, however, that the appended drawings illustrate only typical embodiments of this invention and are therefore not to be considered limiting of its scope, for the invention may admit to other equally effective embodiments.

DETAILED DESCRIPTION

In the present examples, a specification of a background typically includes a geometric specification of a location or a "set" into which objects, described below, are placed. The geometric specification may include geometric boundaries, one or more environmental maps, and the like. The environment maps may be static or vary with time. In examples of the present disclosure, a set may represent any location where the objects are placed, such as a room, an interior location, an exterior location, or the like.

The objects are placed or positioned by the animator into the set. These objects may be inanimate objects with a set, such as furniture, plants, vehicles, and the like. Additionally, these objects may be objects that move or are moved within the set, for example, characters, chairs, doors, and the like. In the present embodiment, objects may be simple to complex, with some objects being formed from one or more similar objects. In some embodiments, only portions of objects may be retrieved from a memory, and the remaining portions of the objects are dynamically created before being rendered.

In the present example, objects are typically stored separately from each other. For example, each object may be stored in its own file and be retrieved by a computer file system. In other examples, data for more than one object may be included into a single file.

Each set typically includes a specification of light sources and lighting parameters. Lighting data may include light sources, light types (e.g., diffuse, point, etc.), lighting locations, lighting directions, and the like. This lighting data may be stored within a single file or multiple files.

One of the most accurate and straightforward approaches to determining global illumination (including direct and non-direct illumination) for rendering sets in computer graphics is ray tracing. In this method, a rendering engine casts a large number of rays from light sources, surface points, or both, for the purpose of evaluating light transport paths and connectivity, including diffuse bounces, between surface points and the lights.

Bidirectional path tracing combines both shooting rays and gathering rays in the same algorithm to obtain faster convergence of the integral. Shooting rays involves shooting rays from the light sources and creating paths in the set. The path is cut off at a random number of bouncing steps and the resulting light is sent through the projected pixel on the output image. During rendering, billions of paths may be created, and the output image can be generated by taking the mean of every pixel that received some contributions. Gathering rays involves gathering rays from a point on the surface of an object. Generally, a ray is projected from the surface to the set in a bouncing path that terminates when a light source is intersected. The light may then be sent backwards through the path and to the output pixel. The creation of a single path is called a "sample." The final output of the pixel is the arithmetic mean of all the samples taken. Referring back to bidirectional path tracing, both the shooting path and the gathering path are traced independently. The head of the shooting path is connected to the tail of the gathering path. The light may then be attenuated at every bounce and back out into the pixel. Although the extra speed of the convergence may outweigh the performance loss from the extra ray casts on the shooting side, the data from the extra ray casts takes up excess memory and also slows down computation.

The present disclosure provides techniques for selectively using bidirectional path tracing to advantageously improve image sharpness in desired areas of an object, while minimizing the amount of data needed in conventional bidirectional path tracing techniques. One embodiment provides a method for rendering an object in a set. The illumination agent designates a region of interest in the set to be rendered. The illumination agent defines an amount of photons to be directed towards the region of interest on the object. The illumination agent generates a photon map of the object based on the region of interest and the amount of photons to be directed towards the region of interest. The illumination agent transmits the photon map for processing.

Figure 1A:
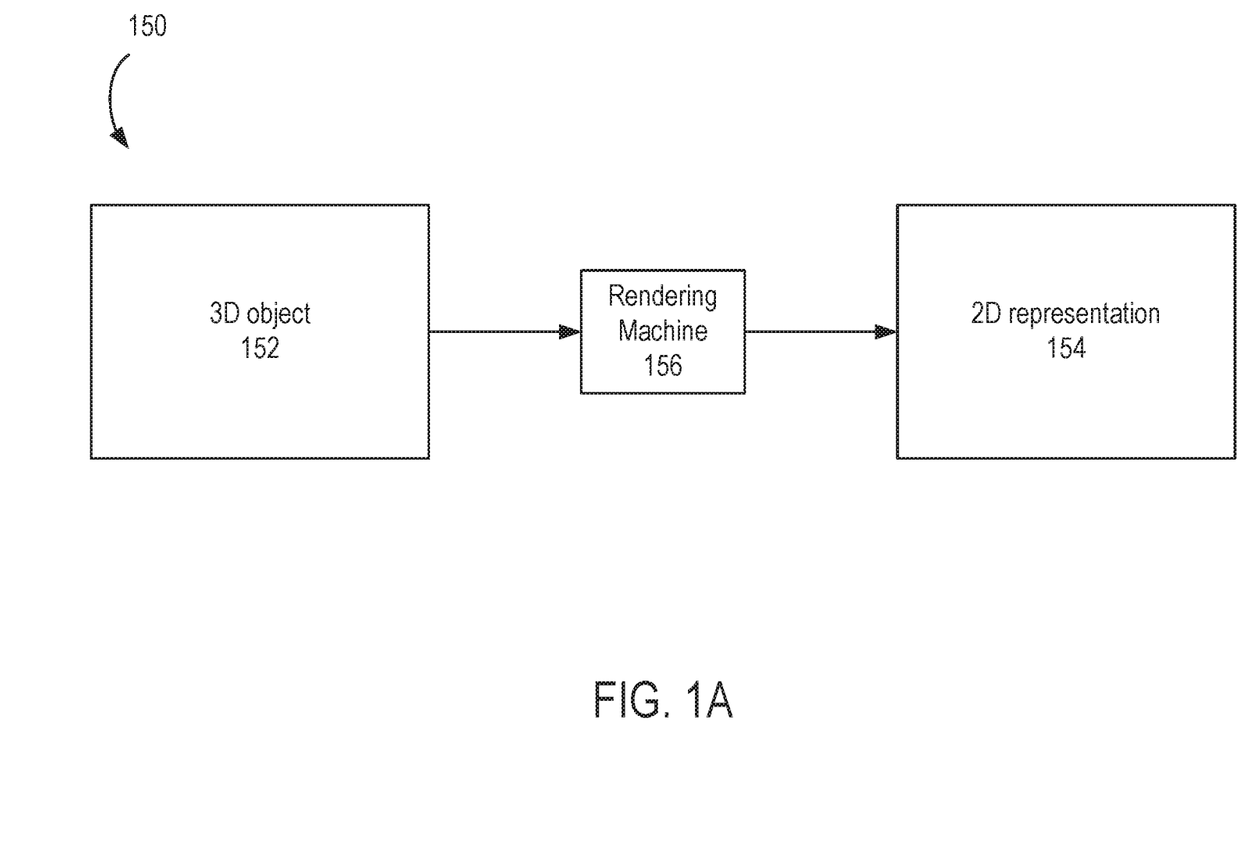
FIG. 1A generally describes the three-dimensional rendering process, according to one embodiment.

FIG. 1A generally describes the three-dimensional rendering process 150, according to one embodiment. Generally the rendering process 150 includes an input in the form of a three-dimensional (3D) object 152 and an output in the form of a two-dimensional (2D) representation 154 of the 3D object 152. This may be done by creating a scene file of the 3D object 152, which may include geometry, viewpoint, texture, lighting, and shading information as a description of a scene containing the 3D object 152. The data contained in the scene file of the 3D object 152 is passed to a rendering machine 156 (such as GPU 112 discussed below) to be processed.

Figure 1B:
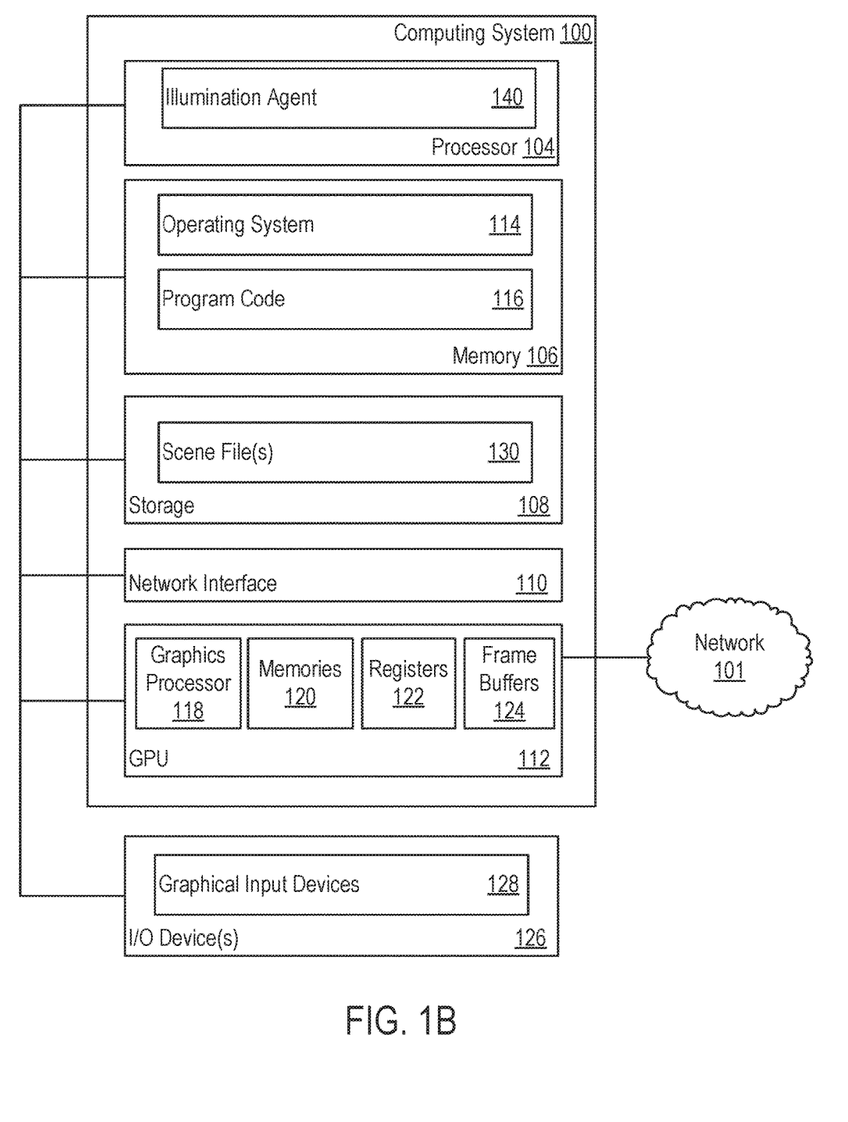
FIG. 1B is a block diagram of a computer system, according to one embodiment.

FIG. 1B is a block diagram of a computer system 100, according to one embodiment. The computer system 100 includes a processor 104, a memory 106, storage 108, network interface 110, and GPU 112. The processor 104 may be any processor capable of performing the functions described herein. The computer system 100 may connect to the network 101 using the network interface 110. Furthermore, as will be understood by one of ordinary skill in the art, any computer system capable of performing the functions described herein may be used. The processor 104 includes an illumination agent 140. The illumination agent 140 is configured to receive instructions from a user in the rendering processes.

In the pictured embodiment, memory 106 contains an operating system 114 and program code 116. Although memory 106 is shown as a single entity, memory 106 may include one or more memory devices having blocks of memory associated with physical addresses, such as random access memory (RAM), read only memory (ROM), flash memory or other types of volatile and/or non-volatile memory. The program code 116 is generally configured to carry out the illumination method discussed in conjunction with FIGS. 2-6 below.

The memory 106 is an example of tangible media configured to store data such as image files, models including geometric descriptions of objects, ordered geometric descriptions of objects, procedural descriptions of models, set descriptor files, shader code, a rendering engine, embodiments of the present disclosure, including executable program code 116, human readable code, or the like. Other types of tangible media include floppy disks, removable hard disks, optical storage media such as CD-ROMs, DVDs, and bar codes, and the like.

The graphics processing unit (GPU) 112 may be any conventional graphics process unit that may be user programmable. Such GPUs are available from NVIDIA, ATI, and other vendors. In this example, GPU 112 includes a graphics processor 118, a number of memories 120, and/or registers 122, and a number of frame buffers 124. The processor 104 transmits the scene file(s) 130 contained in storage 108 to the GPU 112, for example the graphics processor 118, for rendering.

The computer system 100 also includes I/O devices 126. The I/O devices 126 typically include keyboard and mouse devices. In the present embodiment, the I/O devices include graphical input devices 128. Graphical input devices 128 typically include a computer mouse, a trackball, track pad, drawing table, voice command system, eye tracking system, and the like, that allows a user to select icons, text, and the like to appear on a monitor.

Figure 2:
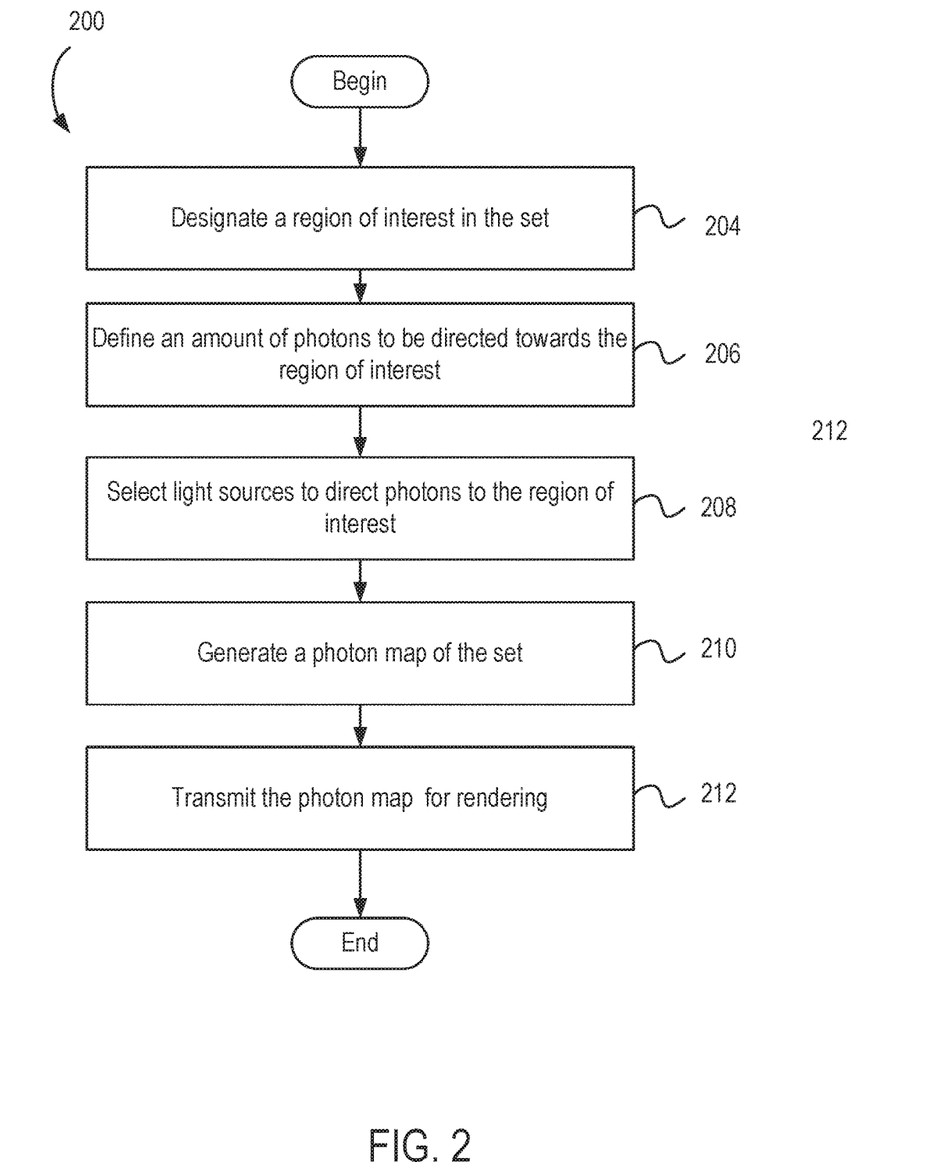
FIG. 2 illustrates a flow diagram of a method according to one embodiment of the present disclosure.
Figure 3A:
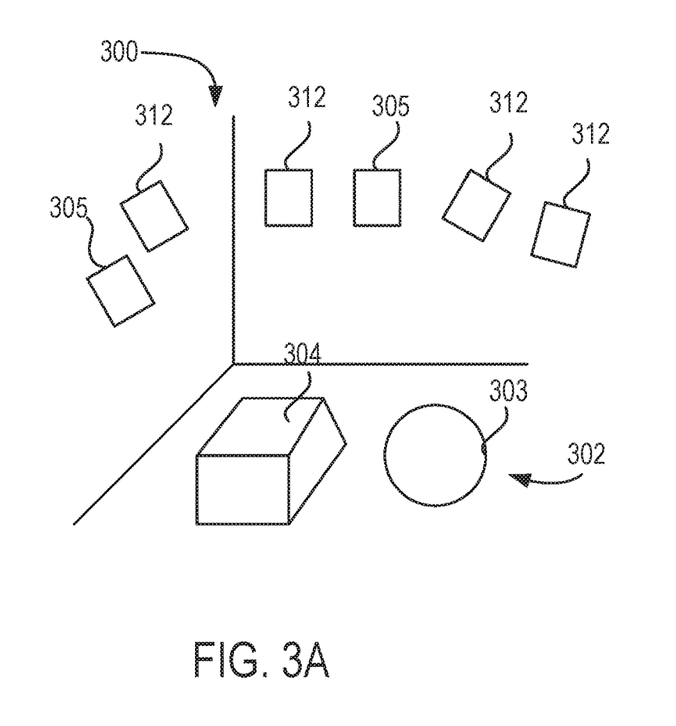
FIGS. 3A-3C illustrate incremental steps of the flow diagram in FIG. 2, according to one embodiment.
Figure 3B:
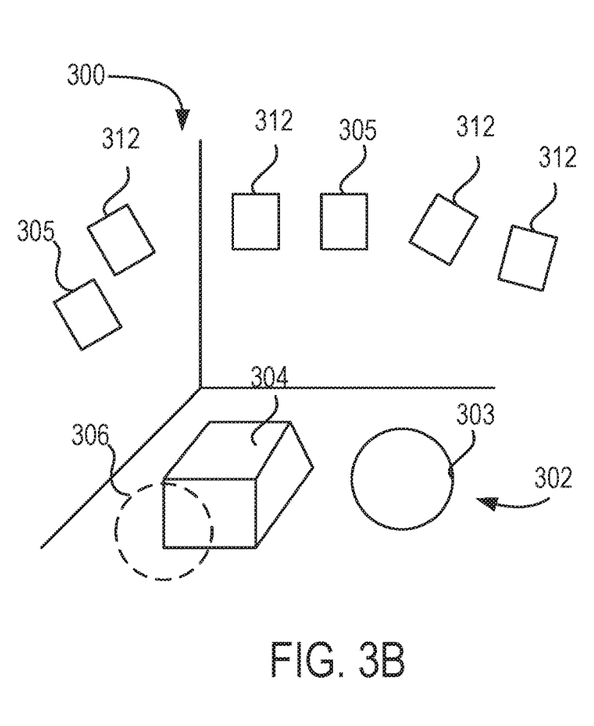
Figure 3C:
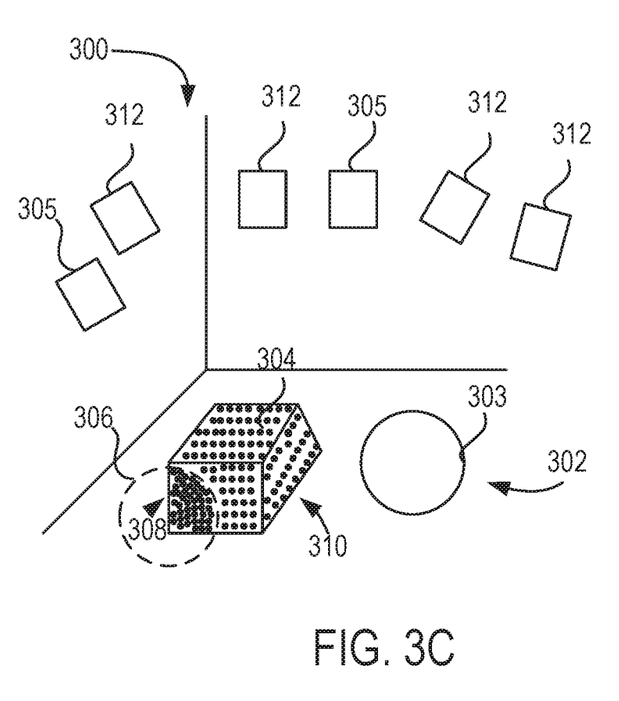

FIG. 2 illustrates a flow diagram of a method 200 according to one embodiment of the present disclosure. FIGS. 3A-3C illustrate incremental steps of the flow diagram in FIG. 2, according to one embodiment. Set 300 includes multiple objects 302. For example, illustrated in set 300 are a cube-shaped object 304 and a spherical-shaped object 303. The scene includes one or more light sources 312 and one or more cameras 305. The one or more light sources 312 are positioned about the set 300. The one or more cameras 305 are also positioned about the set 300. The one or more cameras are configured to capture the light emitted from the one or more cameras 305 directed towards the objects 302.

Photon mapping is one form of ray tracing. Generally, with photon mapping, light packets called photons are sent out into the set from the light sources. Whenever a photon intersects with a surface (e.g., the surface of an object 302), the intersection point and incoming direction are stored in a cache called a photon map. For example, two photon maps are created for a set: one for caustics and a global one for other light. After intersecting the surface, a probability for the photon reflecting, absorbing, or transmitting/refracting is given by the material of the object. A Monte Carlo method called Russian roulette may be used to choose one of the three actions. If the photon is absorbed, no new direction is given, and tracing for that photon ends. If the photon reflects, the surface's bidirectional reflectance distribution function is used to determine the ratio of reflected radiance. Finally, if the photon is transmitting, a function for its direction is given depending upon the nature of the transmission. Applying the bidirectional path tracing technique, the photon paths are traced along both the shooting path and the gathering path.

At step 204, the illumination agent 140 receives instructions to select a region of interest in the set. For example, as depicted in FIG. 3B, the illumination agent 140 receives instructions to select a region of interest 306 on the cube-shaped object. The region of interest 306 defines the area of the object 302 to which the bidirectional path tracing technique will be applied. In some examples, the processor 104 may receive one or more instructions defining one or more regions of interest in the set.

At step 206, the illumination agent 140 receives instructions that define an amount of photons to be directed towards to the one or more regions of interest. In one embodiment, the processor may receive instructions that define a select number of photons to be directed to the one or more regions of interest. In another embodiment, the processor may receive instructions that define a select density of photons to be directed towards the one or more regions of interest.

Optionally, at step 208, the illumination agent 140 may receive instructions to select which subset of light sources can trace photons. For example, in one embodiment, only a select subset of sources will be configured to trace photons, and that subset can mix and match the light sources that are tracing the photons with the light sources that are not tracing the photons. In yet another embodiment, only a select subset of light sources are configured to use a bi-directional tracing technique to trace photons, while light sources outside of the subset are configured to use a conventional path tracing technique (e.g., unidirectional path tracing). As depicted in FIGS. 3A-3C, a plurality of light sources 312 is positioned around the set 300. One or more light sources 312 are positioned about the region of interest 306. The paths of the photons emitted from the one or more light sources 312 may be automatically traced using the bidirectional path tracing technique.

At step 210, the illumination agent 140 generates a photon map for the region of interest based on the information received in steps 202-208. At step 212, the illumination agent 140 transmits the photon map to the GPU 112 for rendering. Defining a smaller region in the set to apply the bidirectional path tracing technique generates a two-dimensional image of the three-dimensional object that improves the detail and sharpness for a region of interest, which can produce better quality images. Additionally, rather than applying photons uniformly to objects in a set, selectively applying photons to specific regions defined in the set decreases the amount of data stored in memory to be used for rendering, thus providing a more efficient method of achieving image sharpness.

Figure 4:
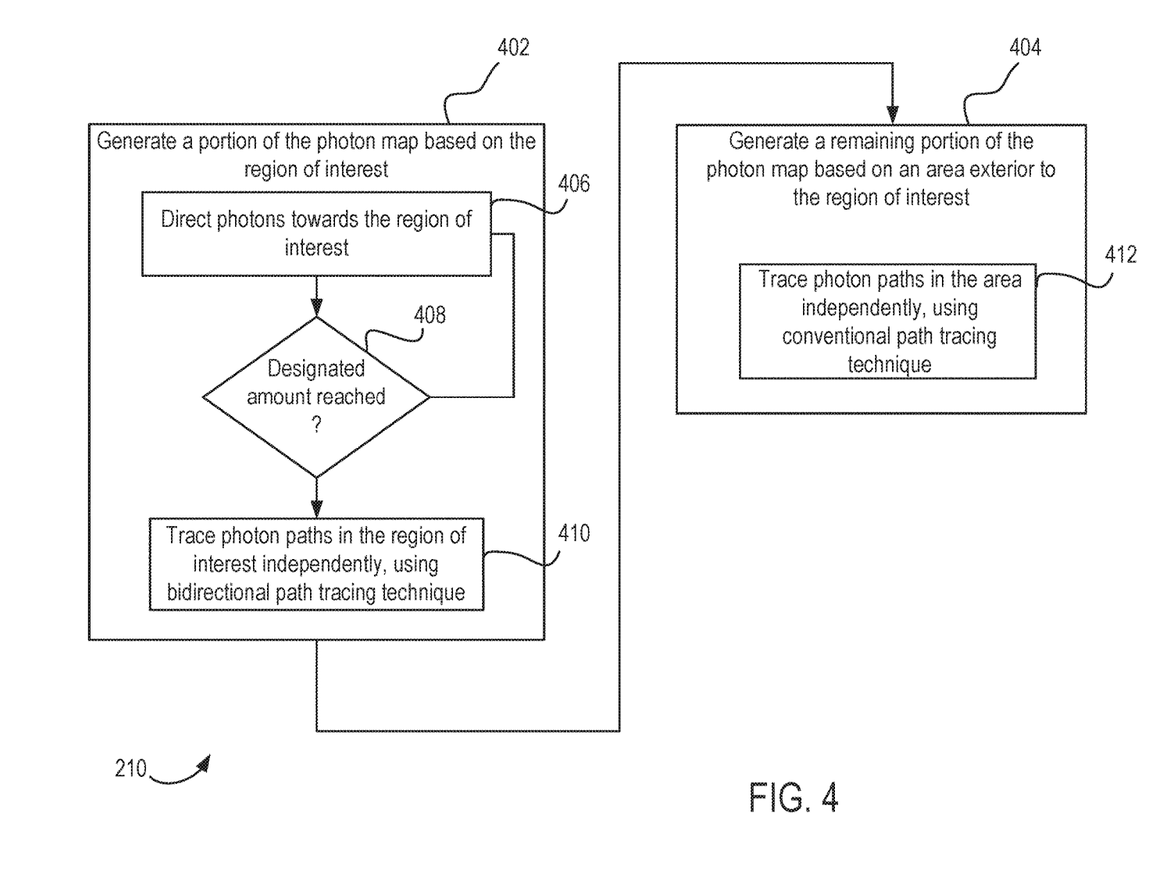
FIG. 4 illustrates a detail flow diagram of a step in the method of FIG. 2, according to one embodiment.

FIG. 4 illustrates step 210 in greater detail, according to one embodiment. At step 210, the illumination agent 140 generates a photon map for the three-dimensional set. Step 210 includes substeps 402 and 404. At substep 402, the illumination agent generates a portion of the photon map for the region of interest 306. The illumination agent 140 communicates with the one or more light sources to direct photons towards the one or more objects 302 in the three-dimensional scene (step 406). The one or more light sources are configured to direct photons towards the one or more objects 302 in the three-dimensional set. At decision block 408, the illumination agent 140 determines whether the designated amount of photons has been reached. If the designated amount of photons has not been reached, the method reverts to step 406 for continual emittance of photons. If, however, the desired amount of photons has been reached, the illumination agent 140 begins a tracing process. The illumination agent traces the photon paths within the region of interest independently using the bidirectional path tracing technique (step 410). Confining the bidirectional path tracing technique to a defined area, such as region of interest 306, allows for greater (or less) detail in the region of interest 306. For example, defining the region of interest to receive a greater number of photons compared to the area outside the region of interest results in an image having a higher detail or may otherwise have a higher visual quality within the region of interest compared to areas outside the region of interest. In another example, defining the one or more regions of interest to use a relatively small amount of photons for the light sources in the area results in a generated image that may have less detail and/or more blur within the region of interest. As illustrated in FIG. 3C, a greater density 308 of photons is illustrated in the region of interest 306 compared to a lesser density 310 of photons illustrated in the area exterior to the region of interest 306.

After the illumination agent 140 generates a portion of the photon map based on the region of interest, the illumination agent 140 generates a remaining portion of the photon map based on an area exterior to the region of interest (substep 404). The illumination agent traces the photon paths within the area exterior to the region of interest independently using a conventional path tracing technique (step 412). For example, the illumination agent 140 may trace the photon paths within the area exterior to the region of interest using a conventional unidirectional path tracing technique. Using the conventional path tracing technique in the area exterior to the region of interest decreases the processing time, as well as frees up storage compared to the data required for bidirectional path tracing techniques.

Figure 5:
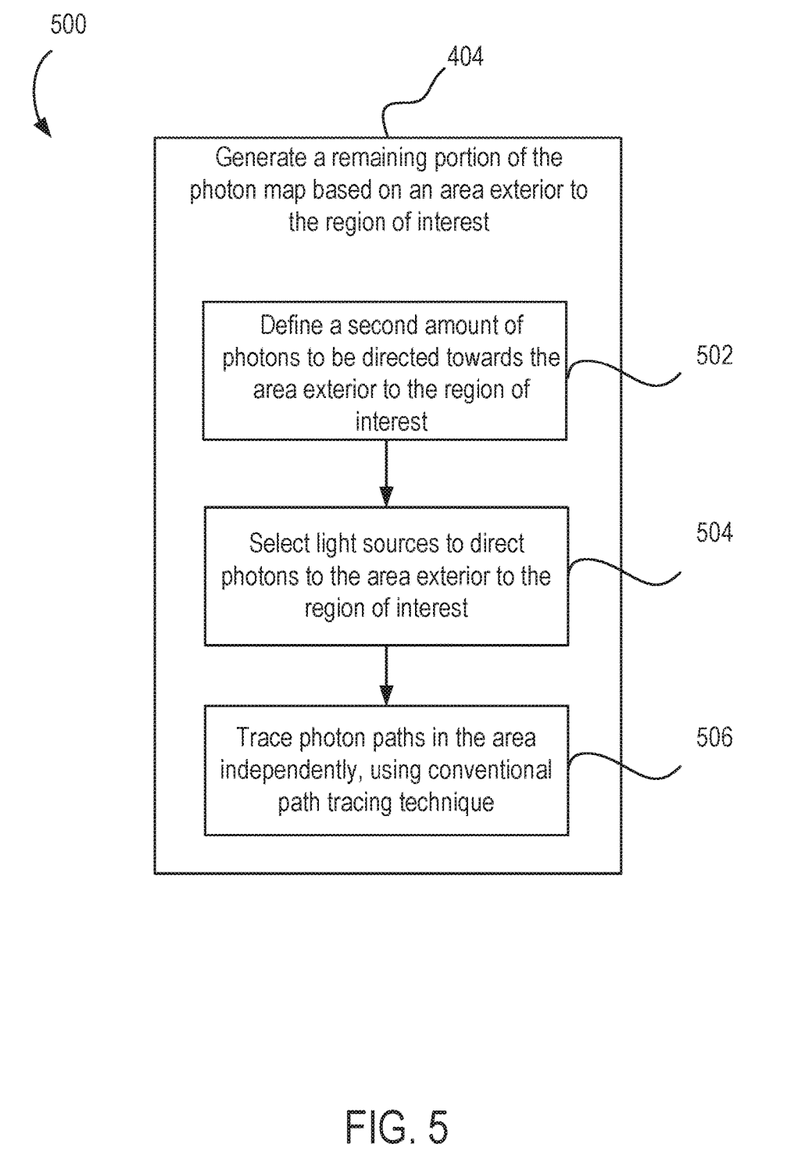
FIG. 5 illustrates a flow diagram of a method according to one embodiment of the present disclosure.

FIG. 5 illustrates a flow diagram of a method 500 according to one embodiment of the present disclosure. The method 500 includes step 402 from FIG. 4. After the illumination agent 140 generates a first portion of the photon map based on the region of interest, at step 502 the illumination agent 140 defines a second amount of photons to be directed towards an area exterior to the region of interest. As shown in FIG. 3B, the set 300 includes an area 350 exterior to the region of interest 306. For example, the area 350 includes the remaining parts of the set 300. At step 504, the illumination agent 140 may optionally select the light sources to direct photons to the area exterior to the region of interest. For example, by selecting the light sources to direct photons to the area exterior to the region of interest, the illumination agent 140 may designate that photons emitted from the selected light sources be traced using conventional path tracing techniques. The second amount of photons is used by the illumination agent 140 to generate the remaining portion of the photon map after a portion of the photon map corresponding to the region of interest 306 is generated. At step 506, the illumination agent 140 traces the paths of the second amount of photons using conventional path tracing techniques to improve calculation time as well as decrease the amount of points stored in memory. As such, a quicker and more efficient photon map may be generated, while still providing adequate information to obtain the sharpness desired in the region of interest.

Figure 6:
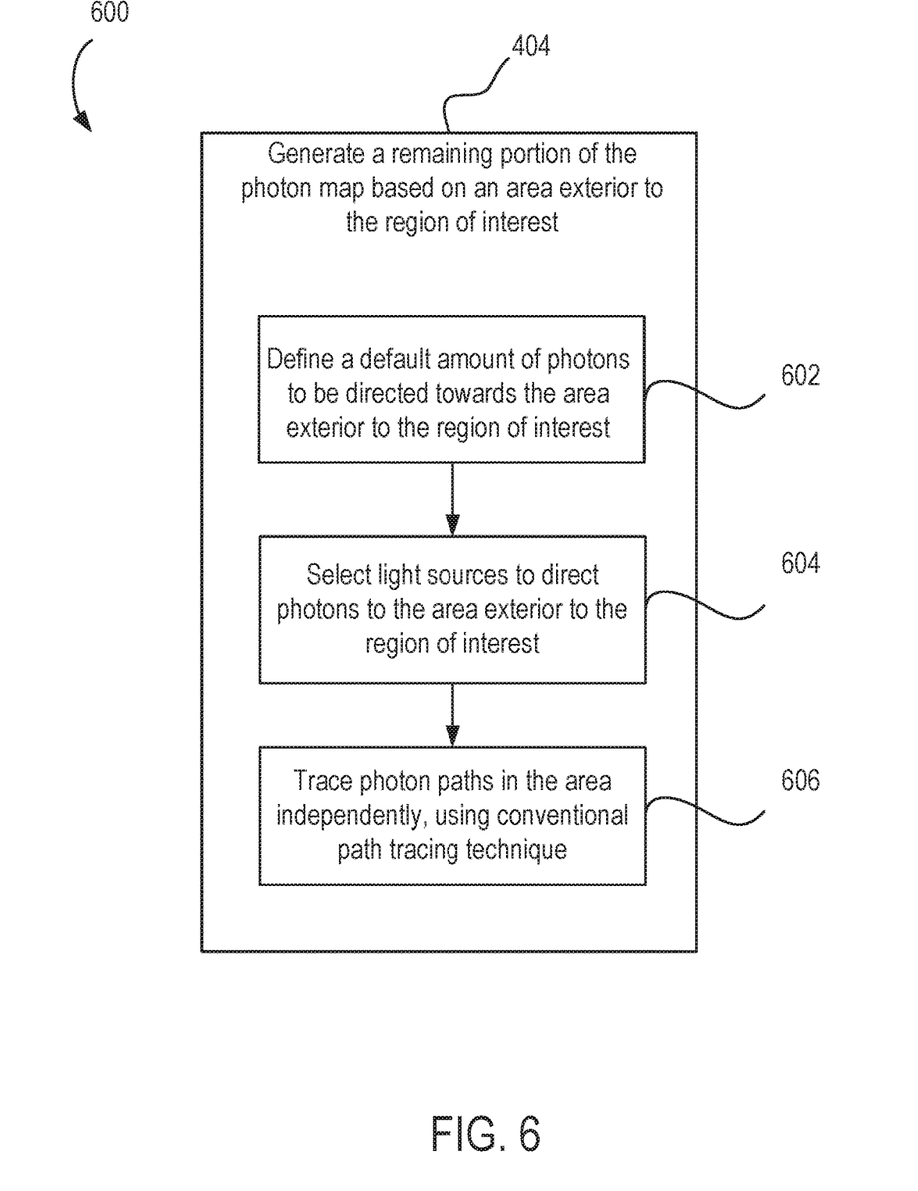
FIG. 6 illustrates a flow diagram of a method according to one embodiment of the present disclosure.

FIG. 6 illustrates a flow diagram of a method 600 according to one embodiment of the present disclosure. The method 600 includes step 402 from FIG. 4. After the illumination agent 140 generates a first portion of the photon map based on the region of interest, at step 602 the illumination agent 140 determines a default amount of photons to be directed to an area exterior to the region of interest. For example, the illumination agent 140 may determine the typical amount of photons that is directed to a set using conventional path tracing techniques. As shown in FIG. 3B, the set 300 includes an area 350 exterior to the region of interest 306. For example, the area 350 includes the remaining parts of the set 300. At step 604, the illumination agent 140 may optionally select the light sources to direct photons to the area exterior to the region of interest. For example, by selecting the light sources to direct photons to the area exterior to the region of interest, the illumination agent 140 may designate that photons emitted from the selected light sources be traced using conventional path tracing techniques. The default amount of photons is used by the illumination agent 140 to generate the remaining portion of the photon map after a portion of the photon map corresponding to the region of interest 306 is generated. At step 606, the illumination agent 140 traces the paths of the default amount of photons using conventional path tracing techniques to improve calculation time as well as decrease the amount of points stored in memory. As such, a quicker and more efficient photon map may be generated, while still providing adequate information to obtain the sharpness desired in the region of interest.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access applications (e.g., program code 116) or related data available in the cloud. For example, the program code 116 could execute on a computing system in the cloud. In such a case, the program code 116 could perform the selective illumination and store scene files 130 at a storage location in the cloud. Doing so allows a user to access this information from any computing system attached to a network connected to the cloud (e.g., the Internet).

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order or out of order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A computer-implemented method of rendering one or more objects in a three-dimensional set, the computer-implemented method comprising:
   specifying (i) a region of interest in the three-dimensional set comprising the one or more objects to be rendered and (ii) a first amount of photons to be directed towards the specified region of interest;
   generating a first portion of a photon map of the three-dimensional set according to a first path tracing technique and based on the specified region of interest and the first amount of photons;
   generating, by operation of one or more computer processors, a remainder of the photon map according to a second path tracing technique and based on an area exterior to the specified region of interest and a second amount of photons to be directed towards the area, wherein the first and second path tracing techniques are distinct, wherein the first amount of photons is greater than the second amount of photons; and
   subsequent to generating the photon map, rendering one or more images using the photon map, wherein the rendered one or more images are output.

2. The computer-implemented method of claim 1, wherein generating the first portion of the photon map comprises:
   directing photons towards the specified region of interest until the first amount of photons is met; and
   tracing a path of each photon directed towards the specified region of interest using the first path tracing technique, the first path tracing technique comprising a bidirectional path tracing technique.

3. The computer-implemented method of claim 1, wherein generating the remainder of the photon map comprises:
   tracing a path of each photon directed towards the area exterior to the specified region of interest using the second path tracing technique, the second path tracing technique comprising a unidirectional path tracing technique.

4. The computer-implemented method of claim 1, wherein specifying the first amount of photons to be directed towards the specified region of interest in the three-dimensional set comprises:
   specifying a number of photons to be directed towards the specified region of interest.

5. The computer-implemented method of claim 1, wherein specifying the first amount of photons to be directed towards the specified region of interest in the three-dimensional set comprises:
   specifying a density of photons to be directed towards the specified region of interest.

6. The computer-implemented method of claim 1, further comprising:
   selectively specifying one or more light sources positioned in the three-dimensional set, about one of the one or more objects, to direct photons towards the specified region of interest.

7. The computer-implemented method of claim 6, wherein selectively specifying the one or more light sources positioned in the three-dimensional set comprises:
   specifying the first path tracing technique to be used with the one or more specified light sources, the first path tracing technique comprising a bidirectional path tracing technique.

8. The computer-implemented method of claim 1, wherein the computer-implemented method is performed by an application comprising an illumination agent, wherein generating the first portion of the photon map comprises:
   directing photons towards the specified region of interest until the first amount of photons is met; and
   tracing a path of each photon directed towards the specified region of interest using the first path tracing technique;
   wherein generating the remainder of the photon map comprises tracing a path of each photon directed towards the area exterior to the specified region of interest using the second path tracing technique.

9. The computer-implemented method of claim 8, wherein the first path tracing technique comprises a bidirectional path tracing technique, wherein the second path tracing technique comprises a unidirectional path tracing technique, wherein specifying the first amount of photons to be directed towards the specified region of interest in the three-dimensional set comprises, in respective instances:
   specifying a number of photons to be directed towards the specified region of interest;
   specifying a density of photons to be directed towards the specified region of interest; and specifying an amount of photons to be directed towards the area exterior to the specified region of interest.

10. The computer-implemented method of claim 9, further comprising:
selectively specifying one or more light sources positioned in the three-dimensional set, about one of the one or more objects, to direct photons towards the specified region of interest, wherein selectively specifying the one or more light sources positioned in the three-dimensional set comprises specifying the first path tracing technique to be used with the one or more specified light sources, the first path tracing technique comprising a bidirectional path tracing technique.

11. The computer-implemented method of claim 10, wherein the specified region of interest comprises a first region of interest, wherein the photon map comprises a first photon map, wherein the one or more images comprise a first one or more images, wherein the computer-implemented method further comprises:
specifying (i) a second region of interest in the three-dimensional set to be rendered and (ii) a third amount of photons to be directed towards the second region of interest, wherein the third amount of photons is greater than each of the first and second amounts of photons;
generating a second photon map based, at least in part, on the second region of interest and the third amount of photons to be directed towards the second region of interest; and
rendering a second one or more images using the second photon map, wherein the rendered second one or more images are output.

12. A computer program product for rendering one or more objects in a three-dimensional set, the computer program product comprising:
a non-transitory computer-readable medium having computer-readable program code embodied therewith, the computer-readable program code executable by one or more computer processors to perform an operation comprising:
specifying (i) a region of interest in the three-dimensional set comprising the one or more objects to be rendered and (ii) a first amount of photons to be directed towards the specified region of interest;
generating a first portion of a photon map of the three-dimensional set according to a first path tracing technique and based on the specified region of interest and the first amount of photons;
generating a remainder of the photon map according to a second path tracing technique and based on an area exterior to the specified region of interest and a second amount of photons to be directed towards the area, wherein the first and second path tracing techniques are distinct, wherein the first amount of photons is greater than the second amount of photons; and
subsequent to generating the photon map, rendering one or more images using the photon map, wherein the rendered one or more images are output.

13. The computer program product of claim 12, wherein generating the first portion of the photon map comprises:
directing photons towards the specified region of interest until the first amount of photons is met; and
tracing a path of each photon directed towards the specified region of interest using the first path tracing technique, the first path tracing technique comprising a bidirectional path tracing technique.

14. The computer program product of claim 12, wherein generating the remainder of the photon map comprises:
tracing a path of each photon directed towards the area exterior to the specified region of interest using the second path tracing technique, the second path tracing technique comprising a conventional path tracing technique.

15. The computer program product of claim 12, wherein specifying the first amount of photons to be directed towards the specified region of interest in the three-dimensional set comprises:
specifying a number of photons to be directed towards the specified region of interest.

16. The computer program product of claim 12, wherein specifying the first amount of photons to be directed towards the specified region of interest in the three-dimensional set comprises:
specifying a density of photons to be directed towards the specified region of interest.

17. The computer program product of claim 12, wherein the operation further comprises:
selectively specifying one or more light sources positioned in the three-dimensional set, about one of the one or more objects, to direct photons towards the specified region of interest.

18. The computer program product of claim 17, wherein selectively specifying the one or more light sources positioned in the three-dimensional set comprises:
specifying the first path tracing technique to be used with the one or more specified light sources, the first path tracing technique comprising a bidirectional path tracing technique.

19. A system for rendering one or more objects in a three-dimensional set, the system comprising:
one or more computer processors; and
a memory containing a program executable by the one or more computer processors to performs an operation comprising:
specifying (i) a region of interest in the three-dimensional set comprising the one or more objects to be rendered and (ii) a first amount of photons to be directed towards the specified region of interest;
generating a first portion of a photon map of the three-dimensional set according to a first path tracing technique and based on the specified region of interest and the first amount of photons;
generating a remainder of the photon map according to a second path tracing technique and based on an area exterior to the specified region of interest and a second amount of photons to be directed towards the area, wherein the first and second path tracing techniques are distinct, wherein the first amount of photons is greater than the second amount of photons; and
subsequent to generating the photon map, rendering one or more images using the photon map, wherein the rendered one or more images are output.

20. The system of claim 19, wherein generating the first portion of the photon map comprises:
directing photons towards the specified region of interest until the first amount of photons is met; and
tracing a path of each photon directed towards the specified region of interest using the first path tracing technique, the first path tracing technique comprising a bidirectional path tracing technique.

* * * * *

UNITED STATES PATENT AND TRADEMARK OFFICE
CERTIFICATE OF CORRECTION

| | |
|---|---|
| PATENT NO. | : 10,438,403 B1 |
| APPLICATION NO. | : 15/389882 |
| DATED | : October 8, 2019 |
| INVENTOR(S) | : Christophe Hery et al. |

It is certified that error appears in the above-identified patent and that said Letters Patent is hereby corrected as shown below:

In the Claims

In Column 12, Line 37, in Claim 19, delete "performs" and insert -- perform --, therefor.

Signed and Sealed this
Twenty-fifth Day of February, 2020

Andrei Iancu
*Director of the United States Patent and Trademark Office*